United States Patent [19]

Kupcikevicius

[11] 4,133,076
[45] Jan. 9, 1979

[54] LARGE CASINGS STUFFING PRODUCT STOPPERING MEANS

[75] Inventor: Vytautas Kupcikevicius, Chicago, Ill.

[73] Assignee: Union Carbide Corporation, New York, N.Y.

[21] Appl. No.: 812,023

[22] Filed: Jun. 30, 1977

[51] Int. Cl.² ............................................ A22C 11/02
[52] U.S. Cl. ...................................................... 17/41
[58] Field of Search .................. 17/35, 38, 39, 41, 40, 17/36, 37, 33, 49

[56] References Cited
U.S. PATENT DOCUMENTS

| 2,871,508 | 2/1959 | Hill | 17/33 X |
| 4,017,941 | 4/1977 | Raudys et al. | 17/41 |

Primary Examiner—Willie G. Abercrombie
Attorney, Agent, or Firm—Maurice W. Ryan

[57] ABSTRACT

An emulsion flow shut off valve in apparatus for stuffing viscous food product into tubular flexible casings is interiorly recessed within the apparatus stuffing horn upstream of the stuffing horn discharge orifice a distance far enough to reestablish laminar flow of the product from turbulent flow induced at the valve location.

3 Claims, 4 Drawing Figures

LARGE CASINGS STUFFING PRODUCT STOPPERING MEANS

This invention relates to a method and apparatus for controlling the flow of viscous fluid substances being stuffed into elongate flexible tubular casings, and more particularly to the flow control of food product emulsions being stuffed into continuous lengths of tubular food casings which are clip closed into preselected lengths to make uniform diameter large size sausage products.

In the meat packing industry, techniques are known for the automatic and semiautomatic filling of various types of casings with viscous meat emulsion. In general, these techniques involve positioning a continuous shirred film casing length over a stuffing horn and thereafter continuously deshirring the casing by stuffing it with viscous meat emulsion fed under pressure through the stuffing horn and into the casing interior. As used herein, the term casing or tubular casing is intended to mean tubing of natural material such as animal intestine, or manufactured materials such as collagen, unsupported and fibrous reinforced cellulose, unsupported and fibrous reinforced insolubilized polyvinyl alcohol, or plastics such as polyvinyl chloride, polyvinylidene chloride, polyethylene teraphthalate, polyethylene, and the like. The term "casing length" is intended to mean continuous tubular casing length. Shirred tubular casings are also known in the art as "sticks," such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of the pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation #6 (101 mm. diameter) to #9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

A thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut off from the cylindrical portion.

Advances sought in the art have thus run towards the desiderata of attaining stuffing capability over a fairly wide range of casing diameters, using shirred casings rather than cut lengths, and more broadly, to the continuously reproducible production of product of uniform size, shape, and quality, and having regulated conformations of the leading and trailing closed end portions of the stuffed casing.

For many years, apparatus and methods employed to manufacture encased food products, particularly food products encased in large diameter casing, have relied largely upon manual operator manipulation in controlling emulsion stuffing into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317, 3,751,764, 3,860,996, and 3,975,795.

Although many of the prior art stuffing devices generally provide a fairly wide range of adjustment for producing stuffing casings of desired diameter, the adjustments are usually left to the judgment of the operator, thereby resulting in understuffing or overstuffing caused by deviation from the optimum size recommended by the casing manufacturer. In addition, the prior art devices do not have means for controlling the shape and tightness of stuffing for both the leading and trailing ends of the stuffed casing.

In copending U.S.A. patent application Ser. No. 627,252, filed Oct. 30, 1975, now U.S. Pat. No. 4,044,426, and assigned to the same assignee as this application, a modern and very advanced large sizing food casing apparatus is described.

In general, the apparatus of these earlier inventions comprises a stuffing horn assembly which includes a support tube adapted to be sheathed with the casing to be stuffed and adapted for connection to a pressurized food emulsion supply, typically utilizing a conventional supply hopper and pump system. The support tube of the stuffing horn assembly has an inlet end and a discharge end and serves as a conduit to convey the food emulsion from the supply source connected at its inlet end to its discharge end. The stuffing horn assembly also includes emulsion cut-off means disposed at the discharge end or the inlet end of the support tube to control the flow of emulsion into the casing to be stuffed. Emulsion flow control or cut-off means are provided so that the emulsion flow into the casing can be stopped when a discrete casing length has been fully stuffed and is ready to be tied off into a unit length sausage product.

The emulsion flow control portion of the apparatus takes several forms in the known art. Stoppering means at the discharge end of the stuffing horn assembly which are reciprocally moveable axially of the stuffing horn longitudinal axis between open and closed emulsion or flow stoppering positions are used, as for example, in the U.S. Pat. Nos. 3,860,996 and 3,975,795. In the aforementioned copending U.S. application Ser. No. 627,252, now U.S. Pat. No. 4,044,426 an emulsion cut-off means also is disposed at the discharge end of the stuffing horn. The type of emulsion cut-off means there shown comprises a rotatably moveable cut-off tube open at one end and closed at the other but with a semicircular opening in the end closure. The discharge end of the stuffing horn itself is provided with an end closure which also defines a semicircular opening. By rotating the cut-off tube disposed interiorly of the stuffing horn between open and closed positions 180° of arc apart, the openings in the cut-off tube and the stuffing horn end closure are brought into registering alignment to permit emulsion flow and, alternatively, the end closure of the cut-off tube is brought into registering alignment with the stuffing horn end opening, effectively stopping the flow of emulsion.

It has been found when automatic large size food casing stuffing machines having the emulsion cut-off means on the discharge end of the stuffing horn assembly, such as are described in the aforesaid U.S. application Ser. No. 627,252, now U.S. Pat. No. 4,044,426, are operated continuously in the production of large sausage products, bolognas and the like, that the velocity of emulsion leaving the stuffing horn exit end is so high that the resulting high flow kinetic energy causes the product to be stuffed to a higher than desired diameter. In a typical operation stuffing a size 7-½K cellulose casing at a casing progression rate in the range of 51-64 cm per second, for instance, the velocity of the emulsion leaving the stuffing horns' exit is about 965 cm per second. This high velocity of the emulsion thus, it can be seen, develops a high level of kinetic energy, and tends, as hereinabove mentioned, to stuff the product to a higher diameter than standard.

The kinetic energy developed also occasions a high level of friction between the layers or strata of emulsion being layed up and compacted inside the casing as it is being expanded to its recommended diameter. In the course of a typical casing stuffing operation, the emulsion flow velocity at the exit end of the stuffing horn is about 965 cm per second and the flow velocity of the emulsion drops to about 53 cm per second upon entering the casing. This lower velocity also is the velocity of the forward motion of the casing being stuffed and simultaneously deshirred. The friction developed between the emulsion layers entering the casing under these high kinetic energy conditions, causes a partial breakdown or dehomogenization of the emulsion. After processing the stuffed product, the areas where partial breakdown of the emulsion has occurred appear as dark lines or streaks in crosscut sections of the finished food product. In sausage manufacturing, such light versus dark patterns of cross section in the finished sausage product is called "swirling."

Another effect of the high kinetic energy conditions in modern sausage stuffing techniques is that when the stuffing of the casing in process is terminated and the emulsion shutoff valve is closed, the emulsion tends to continue its forward motion within the casing without further emulsion supply or pressure from the discharge end of the stuffing horn. This phenomenon, in turn, tends to create a vacuum adjacent the second tie end of the product, sucking in air and creating air pockets which are trapped at the second product end section upon the application of the second tie. Swirling lines and air pockets in finished sausage products are detrimental and undesirable, causing wasted product which cannot be sold.

Stuffing apparatus utilizing an emulsion cut-off at the inlet end of the stuffing horn assembly, such as the apparatus disclosed in U.S. Pat. Nos. 3,553,769 and 3,621,513, have proven to be unsatisfactory due to the fact that meat emulsion tends to extrude out of the discharge end of the stuffing horn assembly when the stuffing cycle is interrupted or ended.

During the emulsion mixing and blending operations, some air is invariably entrapped in the emulsion. This entrapped air is compressed when the emulsion is being pumped under pressure. When the pumping is interrupted, for instance when a completed casing link is stuffed and an end tie off is made, the emulsion expands and extrudes through the end of the stuffing horn because the entrapped compressed air expands the emulsion that remains in the stuffing horn assembly beyond the cut-off means. For example, if the stuffing tube length from an emulsion cut-off means to the casing being stuffed is 122 cm, and if the emulsion expands 5 percent, the amount of emulsion extruded from the end of the stuffing horn after the pump is stopped would amount to about 6 cm. After the stuffed casing is tied off, this quantity of emulsion will be entrapped in the casing tail behind the tie off in the case of a precut casing length, or it will be entrapped in the casing portion which is between the end tie of the stuffed casing end and the first tie of the next casing end in the case of continuous stuffing operation on shirred casing. Meat emulsion in the resulting tails is not only a product loss or waste but it also constitutes a sanitation problem.

Accordingly, with this being the state of the art, the present invention was conceived and developed as an improvement in the stuffing apparatus and methods for the production of large size sausage food products for the purpose of eliminating emulsion swirling, air voids in the finished product, and unwanted emulsion expansion.

The improved emulsion shutoff valve according to the present invention provides a means for substantially eliminating the swirling of the emulsion occasioned by layering or stratification of the emulsion entering the casing under high kinetic energy conditions.

The invention further provides for the elimination of air voids at the tie off end of a casing in process by substantially reducing the kinetic energy level of the emulsion entering the casing.

The invention further provides for the accommodation of a normal and acceptable amount of emulsion expansion in an end section of the stuffing apparatus between the point of cutoff and the stuffing horn discharge nozzle.

A further, and significant advantage of the invention, is the assured maintenance of laminar flow of the emulsion from a uniformly circular cross section discharge nozzle at the end of the stuffing horn apparatus.

The reduction in kinetic energy involved in stuffing the casing, also substantially eliminates the problems of stuffed diameter control.

These and other advantages and features of the invention will be the more fully understood and appreciated from the ensuing more detailed description read in the light of the appended drawing wherein.

Figure 1:
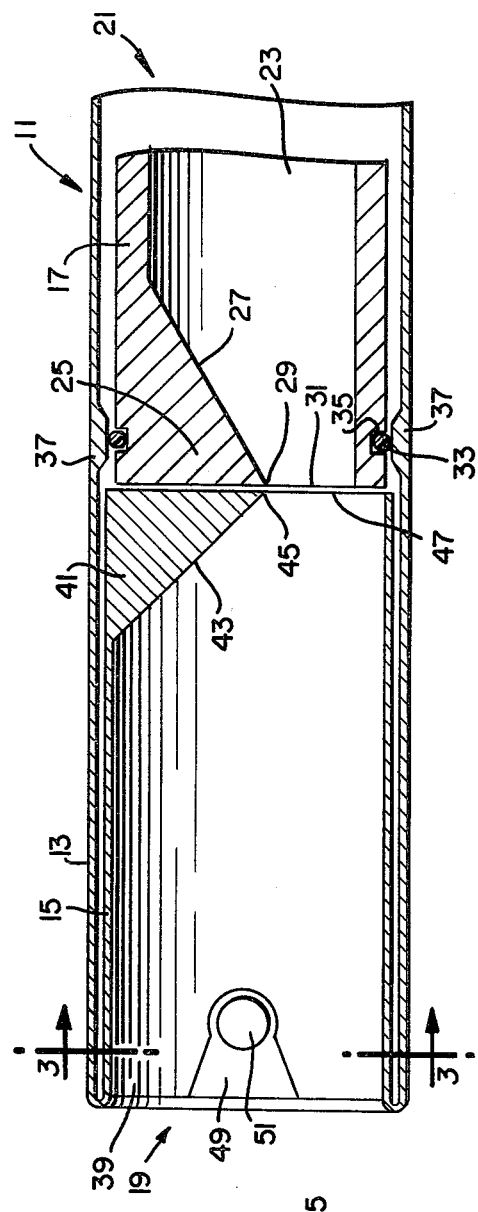
FIG. 1 is a cross sectional view of the end portion of a stuffing horn of an automatic food casing stuffing machine shown in the valve open or emulsion flow position.

In general, the apparatus according to the present invention comprises product flow control apparatus in apparatus for encasing viscous fluid product in continuous lengths of flexible tubular casing by forceably conveying such product through a stuffing horn assembly having an inlet end connecting to a product supply source and a discharge end from which such product passes into such casing, said product flow control apparatus being selectably movable between open and closed positions, and disposed interiorly of said stuffing horn assembly between said inlet end and said discharge end, recessed inwardly of the stuffing horn assembly from the discharge end thereof.

Preferably, said flow control apparatus is recessed inwardly of the stuffing horn assembly discharge end a distance equal to at least twice the equivalent internal diameter of the stuffing horn assembly.

Even more preferably, said flow control apparatus is recessed inwardly of the stuffing horn assembly discharge end at a distance equal to from about twice to about four times the equivalent internal diameter of the stuffing horn assembly in order to reestablish laminar flow.

In a particular embodiment of the invention, the flow control assembly comprises first sleeve means axially aligned with and disposed internally of the stuffing horn assembly, having an open end disposed towards the inlet end of the stuffing horn assembly and an orificed outlet end disposed towards the discharge end of the stuffing horn assembly coacting with second sleeve means axially aligned with and disposed interiorly of the stuffing horn assembly, having an open end disposed towards the discharge end of the stuffing horn assembly and an orificed inlet end disposed towards the inlet end of the stuffing horn assembly and with control means operable exteriorly of the stuffing horn assembly to selectively relatively move the orificed outlet end of the first sleeve means and the orificed inlet end of the second sleeve means into and between product flow and product cutoff positions.

In a preferred embodiment of apparatus according to the invention, the orificed outlet end of the first sleeve means and the orificed inlet end of the second sleeve means are defined by each by a semicircular opening and a semicurcular closure, and the control means is adapted to effect relative rotational movement between the sleeve means about a longitudinal axial centerline of the stuffing horn assembly.

Apparatus according to the invention may further advantageously include first ramp means extending from an interior circumferential surface of the first sleeve means to a diametric boundary line between its semicircular opening and its semicircular closure, and second ramp means extending from an interior circumferential surface of the second sleeve means to a diametric boundary line between its semicircular opening and its semicircular closure.

In a method for encasing viscous fluid product in continuous lengths of flexible tubular casing by forceably directing such product from a product supply source through a stuffing horn assembly and into such casing and wherein product flow is selectably stopped, the improvement according to the invention comprehends controllably selectively stopping the product flow at a location inwardly recessed from the product discharge end of the stuffing horn assembly a distance of at least twice the equivalent diameter of the discharge end of the stuffing horn assembly.

The method according to the invention may further advantageously include the step of re-establishing the cross sectional area of the product flow path between the location at which product flow control is effected and the discharge end of the stuffing horn assembly to at least the magnitude of the cross sectional area of the product flow path between the location at which product flow control is effected and the product supply source.

Figure 2:
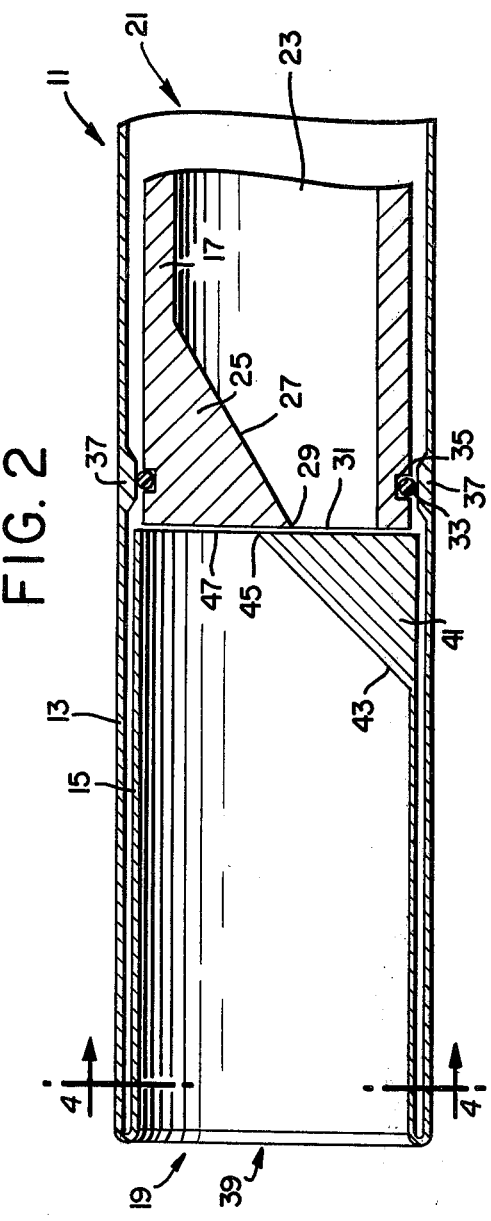
FIG. 2 shows the apparatus of FIG. 1 arranged in the valve closed or emulsion flow stopped position.
Figure 3:
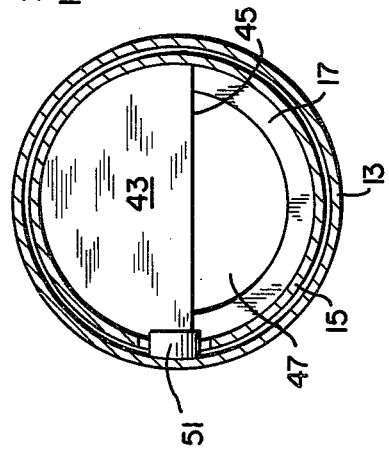
FIG. 3 is a cross sectional view of the apparatus arrangement shown in FIG. 1 taken along the line 3—3.
Figure 4:
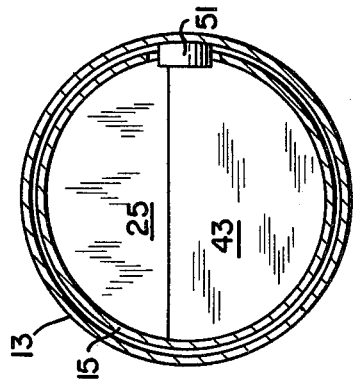
FIG. 4 is a cross section of the apparatus arrangement shown in FIG. 2 taken along the line 4—4.
Figure 1:
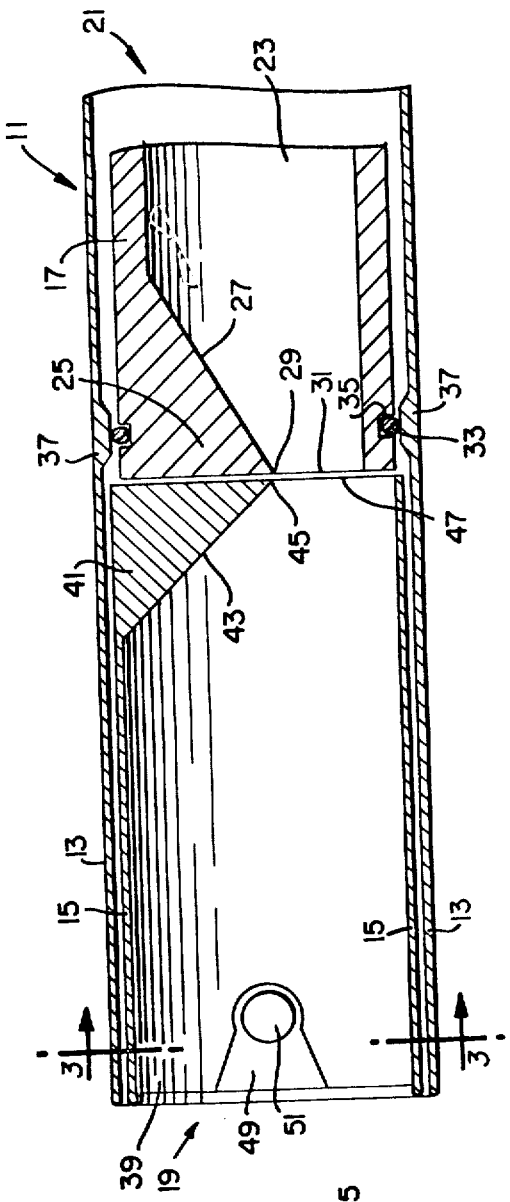
Figure 2:
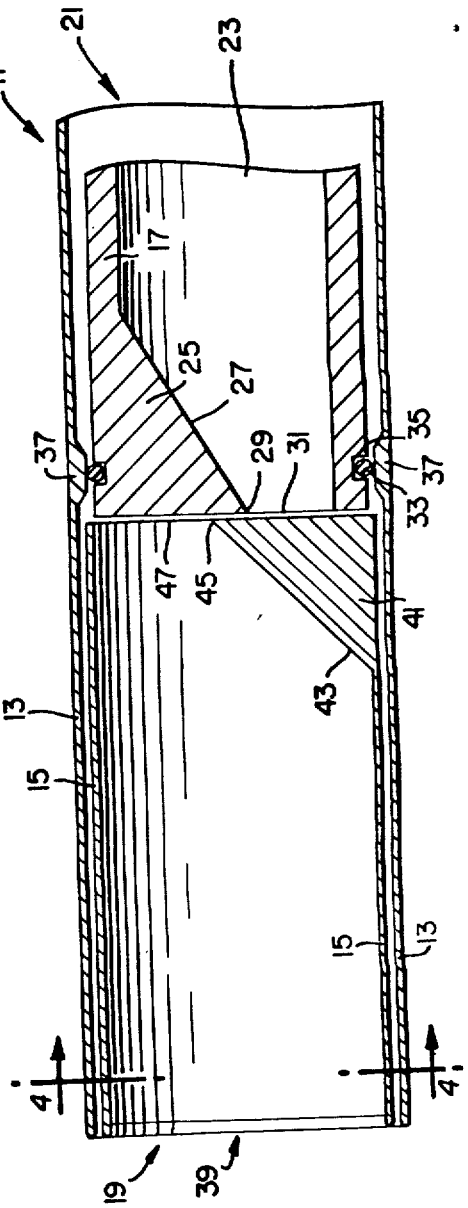
Figure 3:
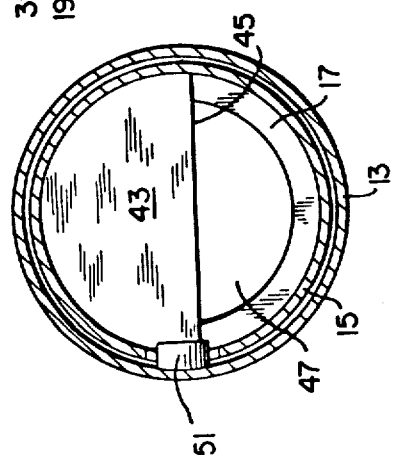
Figure 4:
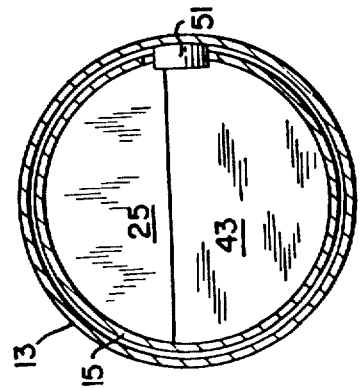

With reference to the drawing part of a stuffing horn assembly 11 is shown to comprise an outer sleeve 13 into which is slidably coaxially assembled a movable flow control sleeve 15 and a fixed sleeve 17, which may, in a particular embodiment, be the main conduit of the stuffing horn assembly. The discharge end 19 of the stuffing horn assembly is to the left as shown in FIGS. 1 and 2, and the right ends of the FIGS. 1 and 2 apparatus communicate with the inlet end 21 of a typical stuffing horn assembly.

Fixed sleeve 17 has an open end 23 disposed towards the inlet end 21 of the stuffing horn assembly 11. The other end of fixed sleeve 17 is provided with a semicircular closure 25 disposed transversely of the stuffing horn assembly and defined by a ramp 27 extending from an interior circumferential surface of sleeve 17 to a diametric boundary line 29 obtaining between semicircular closure 25 and semicircular opening 31 of said sleeve. The thus defined orificed outlet end of fixed sleeve 17 may further advantageously be provided with a O-ring type seal 33 mounted in a circumferential recess 35 and sealably circumferentially contacting the interior surface of an inwardly swedged portion 37 of the outer sleeve 13.

Movable sleeve 15 has an open end 39 concentrically registering with stuffing horn assembly discharge end 19. The other end of movable sleeve 15 is provided with a semicircular closure 41 disposed transversely of the stuffing horn assembly and defined by a ramp 43 extending from an interior circumferential surface of the sleeve 15 to a diametric boundary line 45 obtaining between semicircular closure 41 and semicircular opening 47. A slot 49 is provided at the open end of movable sleeve 15 to engage a stud pin 51 extending inwardly from the circumferential wall of the outer sleeve 13, providing for the transmission of rotational force applied to outer sleeve 13 and in turn to the movable flow control sleeve 15 through the slot 49 and pin 51 engagement. The means employed to apply the rotational force to the outer sleeve 13 may advantageously be a pulley mechanism selectively operated by a power source on the stuffing apparatus.

The operation of the basic stuffing apparatus, the manner in which shirred casing is loaded on the stuffing horn, the priming of the central conduit system of the stuffing apparatus and descriptions of the control components are all treated in explicit detail in the aforesaid copending application Ser. No. 627,252, now U.S. Pat. No. 4,044,426.

In the operation of this specific improvement on the basic apparatus, the flow-on position is illustrated in FIG. 1 of the drawing. Emulsion being stuffed proceeds from the inlet end 21 of the stuffing horn assembly through the open end 23 of fixed sleeve 17. The emulsion, under pressure, proceeds towards the discharge end 19 of the stuffing horn assembly, passing over the ramp 27 surface, through the semicircular openings 31, 47 of the fixed and moveable sleeves 17, 15 respectively, over the ramp 43 surface, and on out through the moveable sleeve 15 open end 39, which is concentrically registered with the stuffing horn assembly discharge end 19, into the casing being stuffed.

When a preselected length of casing is fully stuffed, the moveable sleeve 15 is rotated 180° through application of rotational moment to the outer sleeve 13 transmitted through the slot 49, pin 51 connection, to the position shown in FIG. 2 of the drawing, the movement bringing moveable sleeve 15 semicircular closure 41 into registering flow cut-off alignment with semicircular opening 31 of the fixed sleeve 17, and, simultaneously, moveable sleeve 15 semicircular opening 47 into registering flow cut-off alignment with semicircular closure 25 of fixed sleeve 17. The emulsion flow is thus stopped and its kinetic energy expended within the interior of the moveable sleeve 15. Due to the small amount of emulsion which is thus left in moveable sleeve 15, any expansion of the pressured emulsion thus stopped will be minimized.

Experiments and tests on apparatus according to the invention have shown that consistently reproducible improved operating results are obtained. Use of the invention has produced uniform diameter sausage products free of swirling, layering, and similar emulsion breakdown effects. There has also been practically complete elimination of air voids within the second product end section with the use of this invention.

Further experiments and development work have shown empirically that the flow control cut-off apparatus is advantageouly recessed inwardly of the stuffing horn assembly discharge end a distance equal to at least twice the equivalent internal diameter of the stuffing horn assembly, preferably at a distance equal to from about twice to about four times the equivalent internal diameter of the stuffing horn assembly.

The materials of construction for apparatus according to the invention are, most preferably, stainless steels, both for structural integrity and for ease of cleaning.

The foregoing description of this invention is illustrative only and should not be construed in any limiting sense, it being understood that persons conversant with the art may conceive of alternative embodiments and modes of the invention, albeit with the spirit of the invention.

What is claimed is:

1. In apparatus for encasing viscous fluid product in continuous lengths of flexible tubular casing by forceably conveying such product through a stuffing horn assembly having an inlet end connecting to a product supply source and a discharge end from which such product passes into such casing, the improvement of a product flow control apparatus assembly which comprises, in combination;

first sleeve means axially aligned with and disposed internally of the stuffing horn assembly, having an open end disposed towards the inlet end of the stuffing horn assembly and an orificed outlet end disposed towards the discharge end of the stuffing horn assembly;

second sleeve means axially aligned with and disposed interiorly of the stuffing horn assembly, having an open end disposed towards the discharge end of the stuffing horn assembly and an orificed inlet end disposed towards the inlet end of the stuffing horn assembly;

and control means operable exteriorly of the stuffing horn assembly to selectively relatively move the orificed outlet end of the first sleeve means and the orificed inlet end of the second sleeve means into and between product flow and product cutoff positions.

2. Apparatus according to claim 1 wherein the orificed outlet end of the first sleeve means and the orificed inlet end of the second sleeve means are defined each by a semicircular opening and a semicircular closure, and the control means is adapted to effect relative rotational movement between said sleeve means about a longitudinal axial centerline of said stuffing horn assembly.

3. Apparatus according to claim 2 in combination with first ramp means extending from an interior circumferential surface of the first sleeve means to a diametric boundary line between its semicircular opening and its semicircular closure, and second ramp means extending from an interior circumferential surface of the second sleeve means to a diametric boundary line between its semicircular opening and its semicircular closure.

* * * * *

UNITED STATES PATENT AND TRADEMARK OFFICE
CERTIFICATE OF CORRECTION

PATENT NO. : 4,133,076

DATED : January 9, 1979

INVENTOR(S) : Vytautas Kupcikevicius

It is certified that error appears in the above—identified patent and that said Letters Patent is hereby corrected as shown below:

The sole sheet of drawing should be deleted and the attached sheet of drawing substituted therefor.

Signed and Sealed this

Twenty-fifth Day of December 1979

[SEAL]

*Attest:*

SIDNEY A. DIAMOND

*Attesting Officer*  *Commissioner of Patents and Trademarks*

Patent No. 4,133,076